Figure 1:
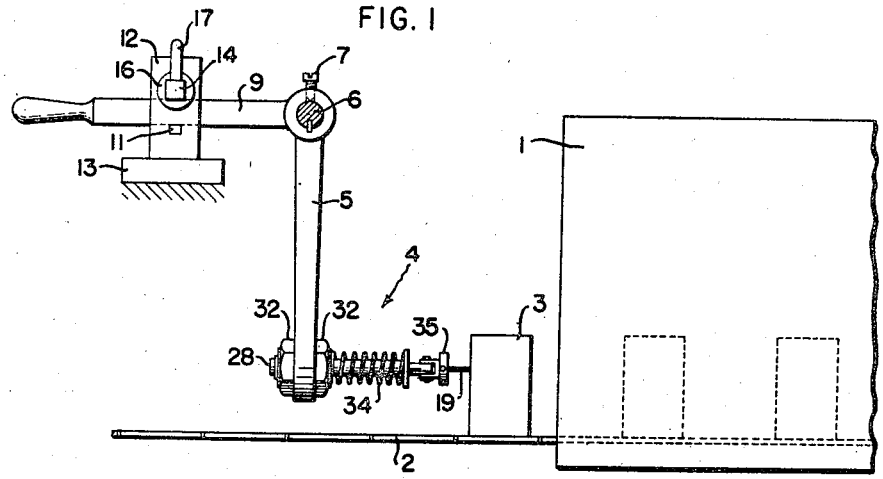

April 5, 1949.   J. P. VOLLRATH   2,466,137
THERMOCOUPLE SUPPORT
Filed May 30, 1944

INVENTOR.
JOSEPH P. VOLLRATH
BY
*C. B. Spangenberg*
ATTORNEY.

Patented Apr. 5, 1949

2,466,137

UNITED STATES PATENT OFFICE 2,466,137

THERMOCOUPLE SUPPORT

Joseph P. Vollrath, Glenside, Pa., assignor, by mesne assignments, to Minneapolis-Honeywell Regulator Company, Minneapolis, Minn., a corporation of Delaware Application May 30, 1944, Serial No. 538,078

1 Claim. (Cl. 136—4)

The present invention relates to thermocouples and more particularly to a thermocouple for use in measuring the surface and the sub-surface temperature of hot metal objects, and a means for mounting this thermocouple in operative position.

In many metal working processes the metal must be heated before it can be worked upon, and the working temperature is critical. It becomes necessary, therefore, to provide an accurate, quick means to measure the temperature of a billet as it leaves a heating furnace and before it is worked upon. The measuring process is complicated by the fact that the billets as they are heated often become coated with a thin oxide film that must be punctured before a reading can be obtained. Another difficulty is that the billets are too hot for an operator to stand near long enough to get an accurate reading with a conventional thermocouple. Furthermore the time necessary to take a reading with a conventional thermocouple is lengthened due to the fact that the thermocouple itself is removed from a position near the furnace and cools down after each reading, with the consequent necessity of reheating it each time.

It is an object of the present invention to provide a thermocouple which will successfully overcome the above mentioned difficulties. In furtherance of this object there is provided a special thermocouple which is resiliently mounted in the path of travel of a hot billet as it is removed from a reheating furnace. In this manner the billet is automatically brought into engagement with the thermocouple and is held against the same with the proper force. A means is provided to support the thermocouple in this position and to release it so that it may be moved out of the path of the billet after a measurement has been made and moved back into said position so that another measurement may be made.

It is a further object of the invention to provide a thermocouple which will penetrate an oxide film that may be formed on the surface of a hot billet to measure the temperature beneath the surface. It is a further object of the invention to provide a thermocouple which may be used to accurately measure the temperature of an irregular object when the thermocouple is held stationary.

The various features of novelty which characterize this invention are pointed out with particularity in the claims annexed to and forming a part of this specification. For a better understanding of the invention, however its advantages and specific objects obtained with its use, reference should be had to the accompanying drawings and descriptive matter in which is illustrated and described a preferred embodiment of the invention.

Figure 2:
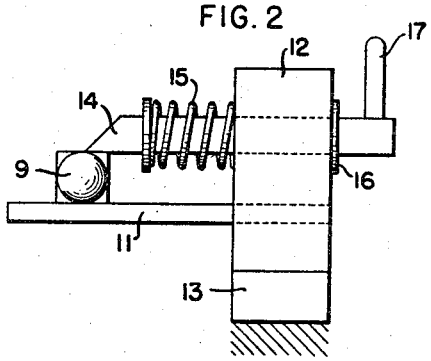
Figure 3:
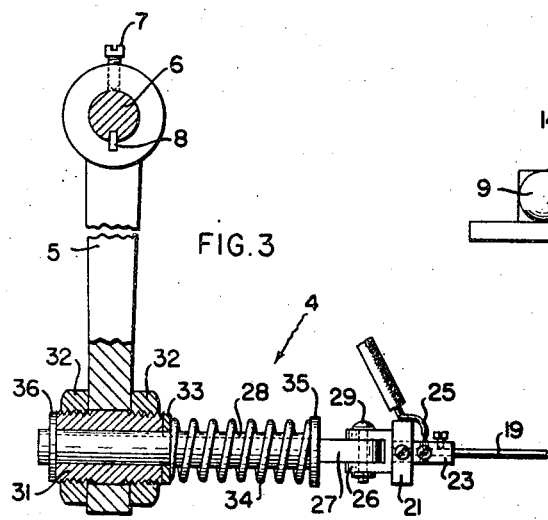
Figure 4:
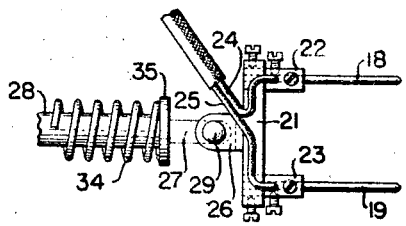

In the drawings:

Figure 1 is a view showing the thermocouple assembly mounted adjacent a furnace, Figure 2 is a view taken from the left of Figure 1, showing the latch, Figure 3 is an enlarged side view partly in section of the thermocouple assembly, and Figure 4 is a top view of a portion of Figure 3.

There is shown in Figure 1 a reheating furnace I for metal billets which furnace is of the type in which the billets are carried through the same by a moving conveyor 2. This conveyer may be started and stopped at will be the operator to bring a new billet from the furnace when it is needed for the processes to which the billets are being supplied. As is shown in the drawing, a thermocouple assembly 4 is located in the path of a billet to be engaged thereby as the billet is being moved from the furnace toward the left. This assembly is mounted on the lower end of a supporting arm 5 that is attached to a shaft 6 in any suitable manner, such as by set screw 7 and/or a key 8. The arm 5 is held in the position shown in Figure 1 by means of a handle 9 that is also attached to the shaft 6, which handle is held against a stop member 11. This stop extends from a support 12 that is attached in any suitable manner to a fixed part 13. As is best shown in Figure 2, the handle 9 rests against the upper surface of the stop 11 and is normally held in that position by means of a latch 14 that is slidably received in the support 12 and which engages the upper surface of the handle 9. This latch is biased into the position shown in Figure 2 by a spring 15, and its terminal position is determined by a collar 16 mounted on the latch to the right of the support 12. When it is desired to move the handle 9 so that the thermocouple assembly may be swung out of the position shown in Figure 1 to permit the billet 3 to be moved to the left to a point where it will be worked upon, an arm 17 on the latch is moved to the right, as seen in Figure 2. When the latch 14 is moved to release the handle 9, this handle is manually moved in a clockwise direction to lift the thermocouple assembly 4 out of the path of the billet 3. The handle is then moved in a counter-clockwise position and is latched in place as shown in Figure 1, ready for the next measurement to be made. It is noted that the shaft 6 is supported in any suitable fashion adjacent the front of the furnace 1 with the arm 5 attached thereto along its length so that the thermocouple assembly 4 is properly positioned with respect to the portion of the billet 3 whose temperature is to be measured. The arm 9 is mounted in a different position along the length of shaft 6 so that it can be reached adjacent the edge of the conveyor 2 without the necessity of an operator leaning over the conveyor or in front of the furnace opening.

The thermocouple assembly 4 is shown more in detail in Figures 3 and 4 to which reference is now made. The thermocouple itself consists of two dissimilar thermocouple wires 18 and 19 that are ground to a point on their ends and which are to engage the billet. These wires are supported on an insulating block 21 by means of suitable collars 22 and 23 that are rigidly fastened to the block, and may be of any metals suitable for the temperature ranges encountered. Each of the thermocouple wires is received in an opening in its respective collar, which collar also has provisions on it for receiving an extension lead 24 or 25. These leads extend to a suitable indicating, controlling and/or recording instrument (not shown) that serves to indicate the temperature of the billet in engagement with the thermocouple. The insulating block 21 is supported by the arm 5 by means of a clevis 26 that is attached thereto. The clevis receives a tongue 27 on a rod 28 that is slidably received in the lower end of the arm 5. A pivot pin 29 extends through the clevis 26, and tongue 27 to pivotally support the insulating member 21 with respect to rod 28.

The thermocouple unit is mounted for movement relative to the arm 5 so that it can retract as a billet 3 is moved into engagement with the thermocouple wires. To this end a tubular bearing member 31 is fastened in an opening in the lower portion of the arm 5 by means of nuts 32. This bearing member has attached to it a key 33 that engages in a suitable key-way formed on the top of rod 28. The key and key-way serve to prevent rotation of the rod 28 as it slides back and forth in the bearing in order that the thermocouple wires and member 21 will always be held in a horizontal position as shown in the drawing. The rod 28 is normally biased to the right by means of a spring 34, one end of which engages an end of the bearing 31 and the other end of which engages a collar 35 that is formed on the rod 28. The rod is limited in its movement to the right by means of a collar or washer 36 that is suitably attached to the left end of the rod and which normally bears against the left face of the bearing 33.

In the operation of the device, when a billet that has been heated is to be used, the operator causes the conveyor 2 to move to the left to bring the billet 3 from the furnace and into engagement with the thermocouple wires 18 and 19. Continued movement of the billet to the left will force the thermocouple assembly in that direction against the force of spring 34 which force is sufficient to cause the points on the ends of the wires 18 and 19 to penetrate a small distance into the surface of the billet. When the operator has noted the temperature of the billet on a suitable indicating instrument to which the thermocouple is connected, he will release the latch 14 by movement of the handle 17. Expansion of spring 28 will then move the supporting parts enough to the right so that arm 9 will be above latch 14. Thereafter, the operator will swing handle 9 in a clockwise position until the billet 3 can clear the thermocouple assembly. The operator will then move the arm 9 in a counter-clockwise direction until it is latched, with the thermocouple assembly in its operative position. It will be noted that even if the billet coming from the furnace is coated with an oxide, the spring 34 will have sufficient strength to force the points of the thermocouple wires through this oxide coating so that a good electrical contact can be made through the metal to the wires. It is also noted that the thermocouple assembly 4 is always held in a position closely adjacent the front of the furnace 1 and is thereby always kept warm so that the time lag for obtaining a correct measurement of the billet temperature is reduced. This is true, since it is not necessary to heat up the thermocouple head as well as the wires each time a measurement is made.

The tilting movement that the thermocouple elements may have relative to rod 28 insures a good electrical contact between the elements and a billet even if the latter is irregular in shape or not placed perpendicular to the rod 28. When a billet engages one wire 18 or 19 before it does the other, block 21 will pivot around pin 29 until the other wire engages the billet. Thereafter, continued movement of the billet will compress spring 34 and force the points of the wires into the side of the hot billet. The depth of penetration of the points can be varied slightly by changing the strength of spring 34.

From the above it will be seen that I have provided a thermocouple which will measure surface temperatures of a heated metal object, which thermocouple is capable of making a good electrical and thermal contact with the metal object even though the object may be coated with non-conducting oxide and may be slightly irregular in shape. This thermocouple assembly is conveniently mounted adjacent the furnace so that it may be moved into and out of operative position with a minimum of time and effort on the part of the operator.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claim, and that in some cases certain features of this invention may sometimes be used to advantage without a corresponding use of other features.

Having now described this invention, what I claim as new and desire to secure by Letters Patent is:

A thermocouple assembly comprising an arm, means to mount said arm for rotative movement around a fixed axis, releasable means to hold said arm in a given position around said axis, a bearing attached to said arm, said bearing having an opening therein extending at an angle to said arm, a rod slidably received in said bearing, means to limit the motion of said rod in opposite directions and means to bias resiliently said rod to one of its limits, a support pivoted on said rod for free oscillating movement about an axis at right angles to the axis of said rod, said pivotal axis being parallel to said arm, and a pair of dissimilar thermocouple wires projecting from said support, a plane through said wires extending at right angles to the axis around which said support rotates.

JOSEPH P. VOLLRATH.

(References on following page)

REFERENCES CITED

The following references are of record in the file of this patent:

UNITED STATES PATENTS

| Number | Name | Date |
|---|---|---|
| 837,249 | Perry | Nov. 27, 1906 |
| 1,936,140 | Obermaier | Nov. 21, 1933 |
| 2,025,015 | Byrns | Dec. 17, 1935 |
| 2,142,677 | Parker | Jan. 3, 1939 |
| 2,194,489 | Woodson | Mar. 26, 1940 |
| 2,285,457 | Obermaier | June 9, 1942 |
| 2,311,886 | Thomas | Feb. 23, 1943 |
| 2,422,124 | Obermaier | June 10, 1947 |

FOREIGN PATENTS

| Number | Country | Date |
|---|---|---|
| 399,541 | Great Britain | Oct. 5, 1933 |

OTHER REFERENCES

Catalog S2-3 (Wheelco) (1941), page 10.
Catalog No. 120 (Pyro) 1922, page 4.
Catalog (Brown) 1924, page 25.